United States Patent
Anger et al.

(10) Patent No.: US 7,758,188 B2
(45) Date of Patent: Jul. 20, 2010

(54) METHOD OF MANUFACTURING RIMLESS SPECTACLES AND A MASK SUITED FOR USE WITH SAID METHOD

(75) Inventors: Wilhelm Anger, Sigmund-Haffner-Gasse 8, Salzburg (AT) 5020; Herbert Reikerstorfer, Freistadt (AT)

(73) Assignee: Wilhelm Anger, Salzburg (AT)

( * ) Notice: Subject to any disclaimer, the term of this patent is extended or adjusted under 35 U.S.C. 154(b) by 85 days.

(21) Appl. No.: 12/177,701

(22) Filed: Jul. 22, 2008

(65) Prior Publication Data

US 2009/0027617 A1    Jan. 29, 2009

(30) Foreign Application Priority Data

Jul. 24, 2007  (EP)  .................. 07113025
Feb. 18, 2008  (EP)  .................. 08151567

(51) Int. Cl.
*G02C 13/00*  (2006.01)
*G02C 1/02*  (2006.01)

(52) U.S. Cl. ....................... 351/178; 351/110
(58) Field of Classification Search ............. 351/110, 351/178
See application file for complete search history.

(56) References Cited

U.S. PATENT DOCUMENTS 5,550,599 A    8/1996  Jannard
5,646,706 A *  7/1997  Izumitani .................. 351/110
5,805,259 A    9/1998  Chao
2004/0233381 A1* 11/2004  Kim et al. ................ 351/110
2008/0246187 A1* 10/2008  Chiu et al. ............... 264/328.1

FOREIGN PATENT DOCUMENTS

| DE | 102005006980 A1 | 8/2006 |
|---|---|---|
| EP | 0361547 A2 | 4/1990 |
| EP | 1584967 A1 | 10/2005 |
| FR | 2624278 A1 | 6/1989 |
| FR | 2749088 A1 | 11/1997 |
| FR | 2793040 A1 | 11/2000 |
| WO | 2004/096496 A1 | 11/2004 |

* cited by examiner

*Primary Examiner*—Darryl J Collins
(74) *Attorney, Agent, or Firm*—Baker & Hostetler LLP

(57) ABSTRACT

The invention relates to a method of manufacturing rimless spectacles in which fasteners of the lugs and the bridge of the spectacles are adhesively bonded to the front side or the rear side of the lenses. In the method first of all two lens blanks are manufactured of a plastic material to the front and rear side of which a coating is applied. The two coated lens blanks are cut and ground in a way that two lenses having a desired lens shape are obtained. At predetermined mounting positions for the fasteners of the lugs and the bridge on the front or rear side of the lenses the coating is removed so as to form joining surfaces which substantially correspond to the joining surfaces of the fasteners as to shape and dimensions. The fasteners are then adhesively bonded to the front side and/or to the rear side of the lenses at the mounting positions. Since in the area of the joining surfaces at the lenses the base material thereof is exposed, a permanently firm adhesively bonded joint can be produced between the fasteners and the lenses on the front or rear side thereof using adhesives known per se.

47 Claims, 6 Drawing Sheets

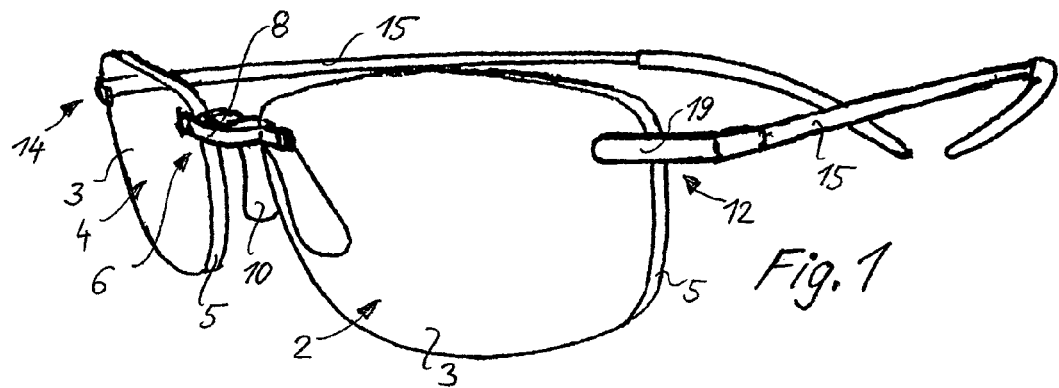
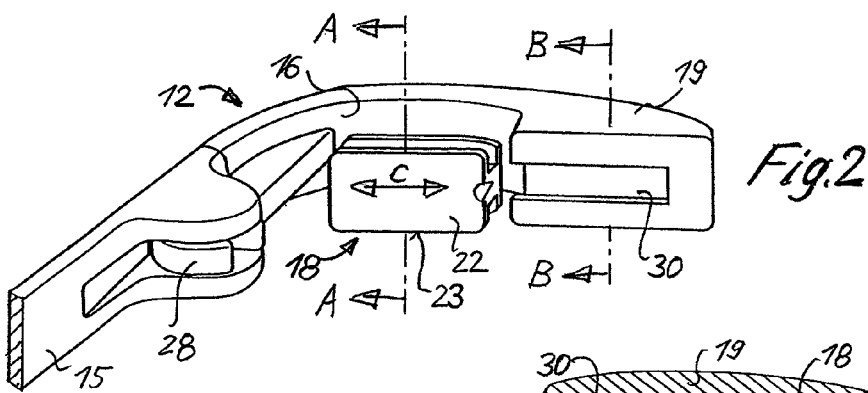
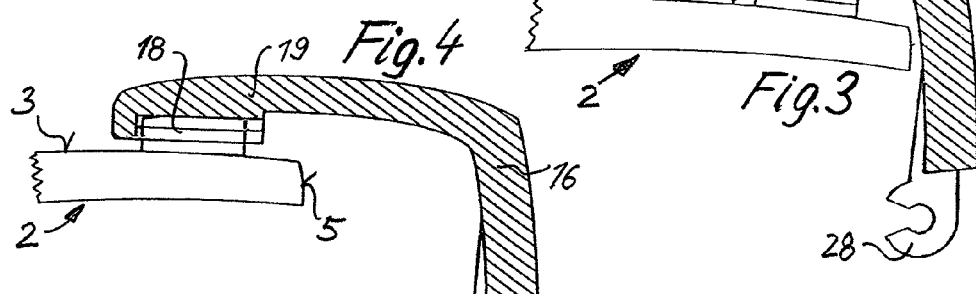
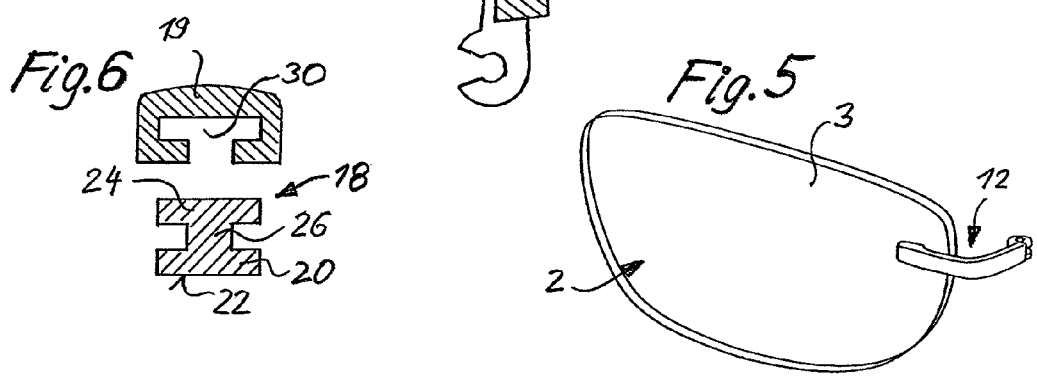

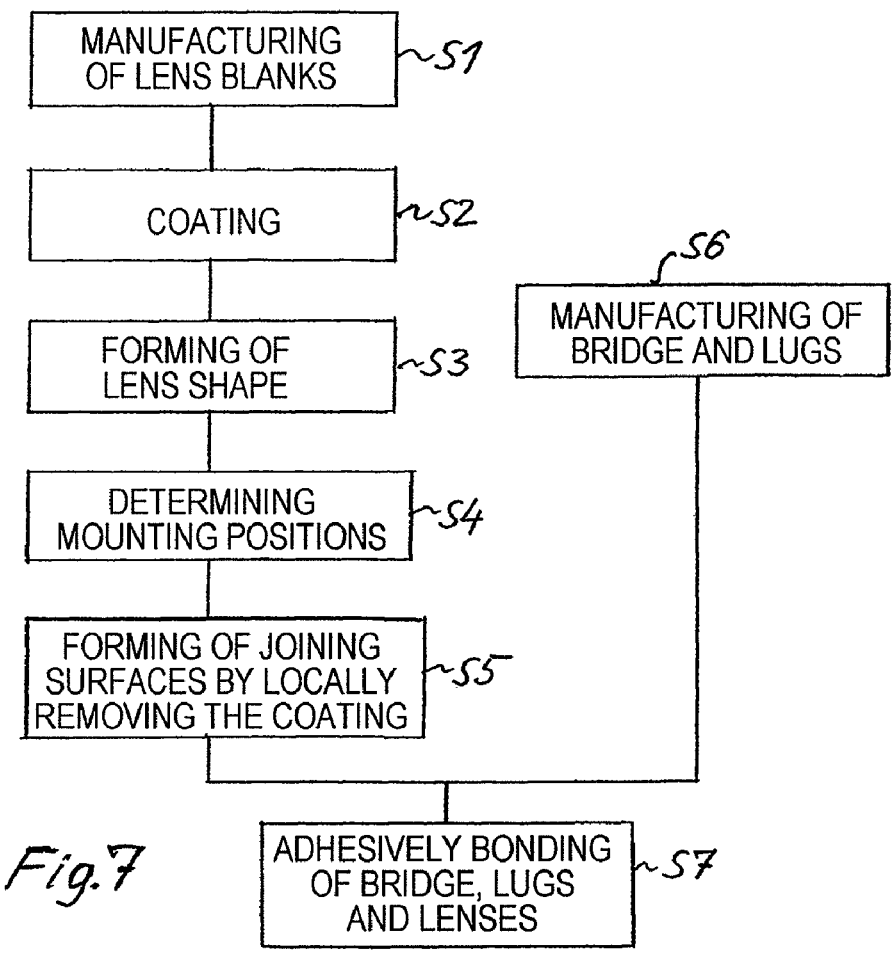
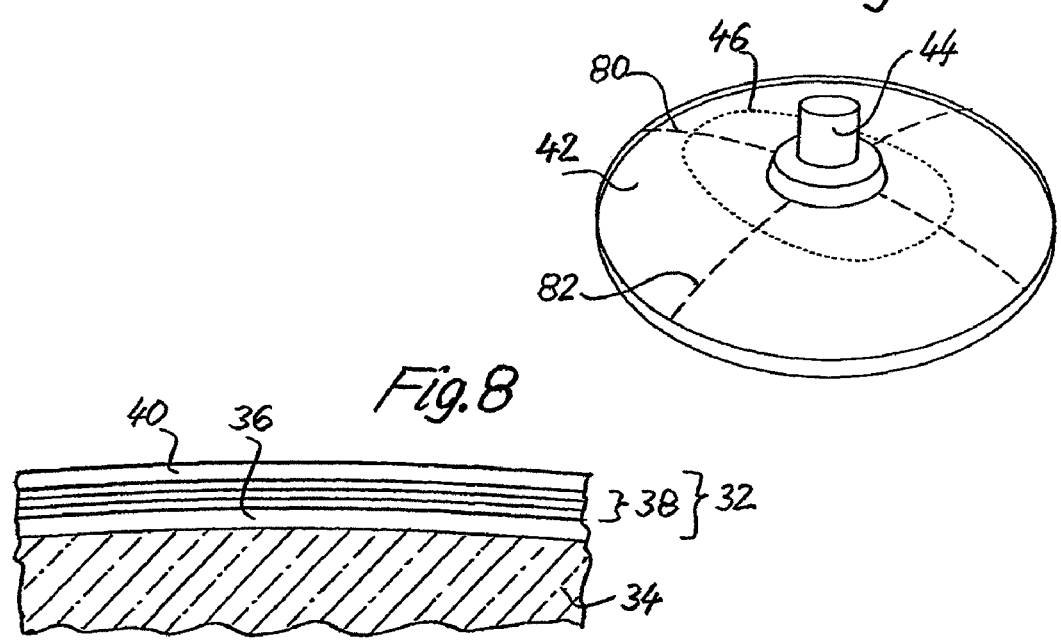

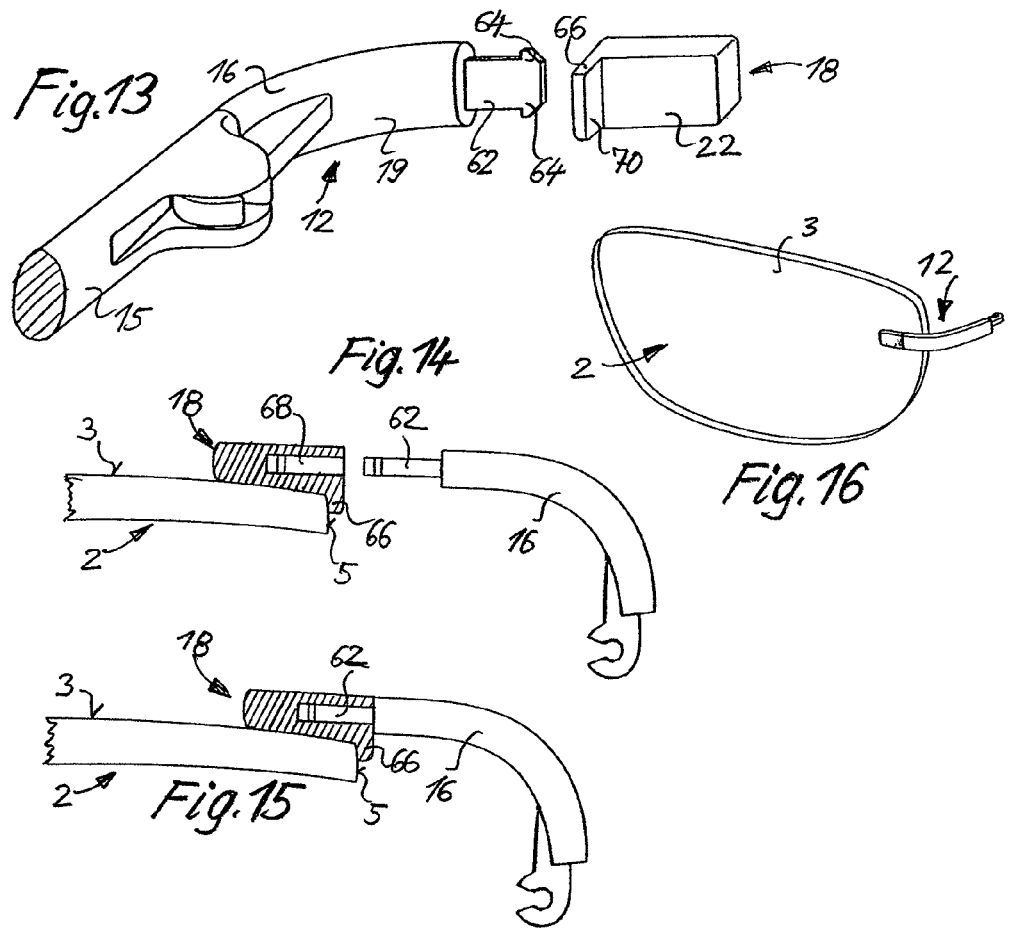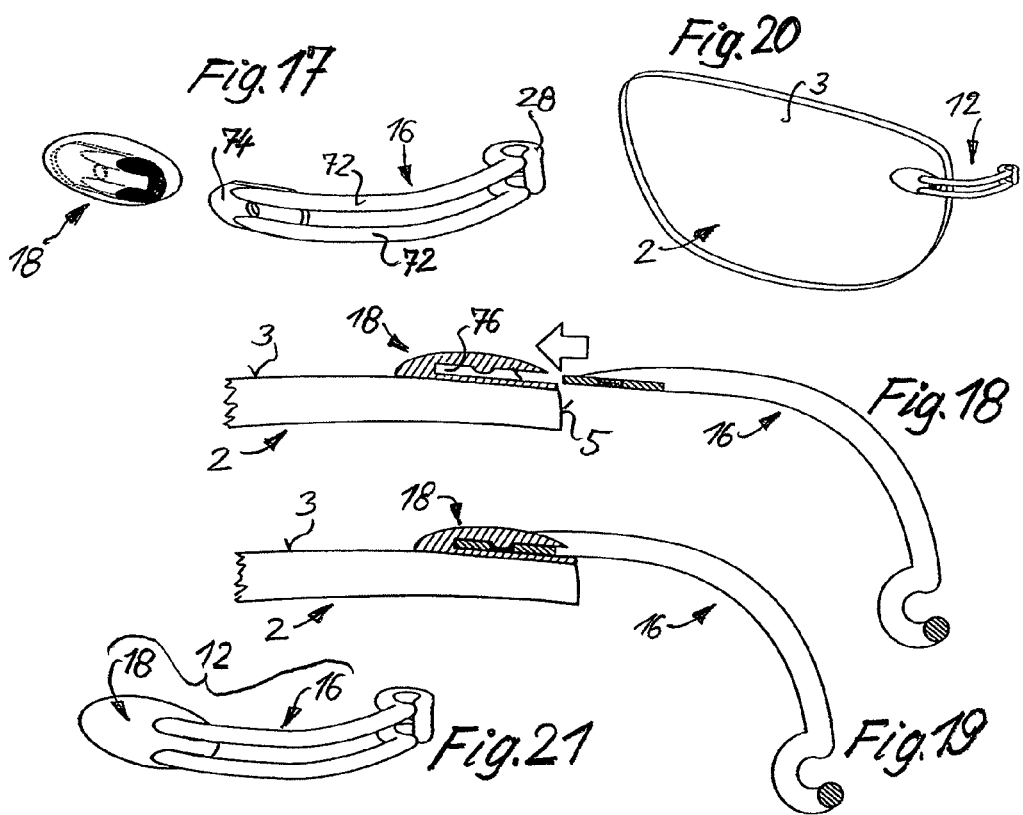

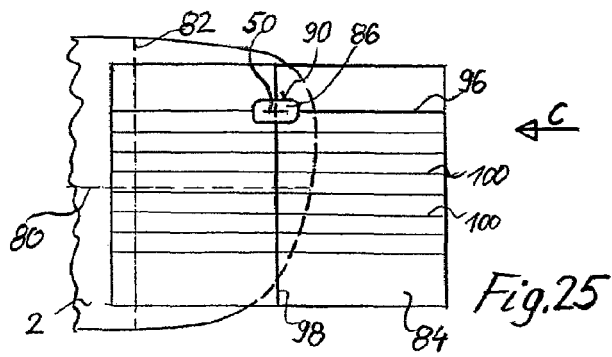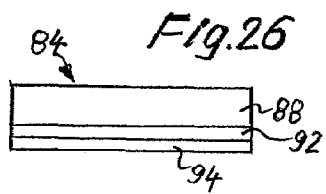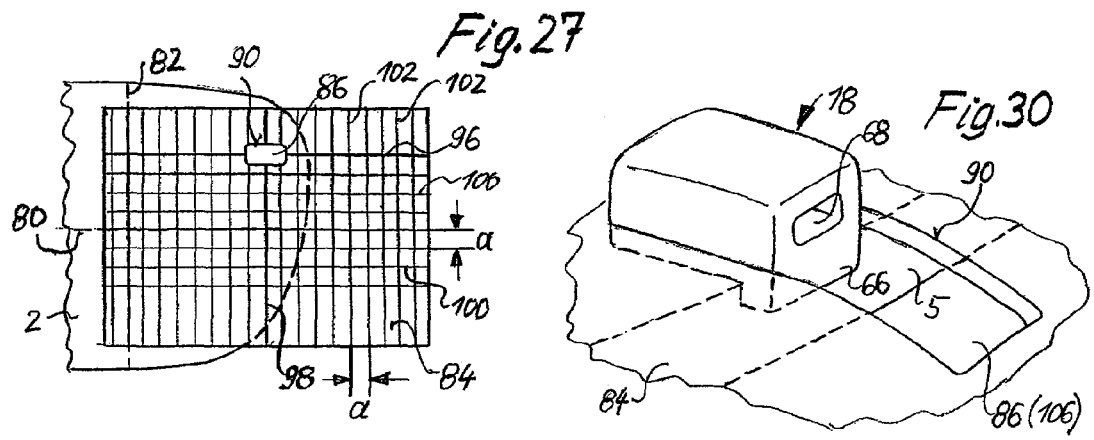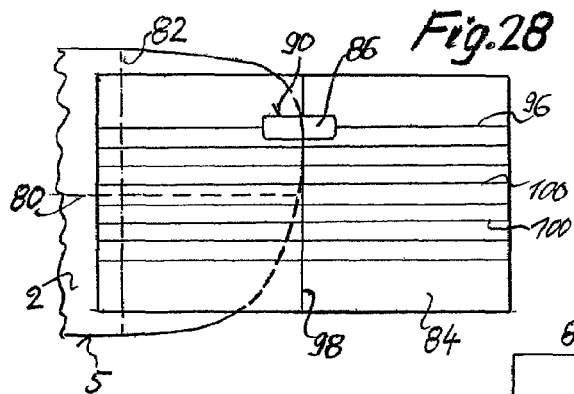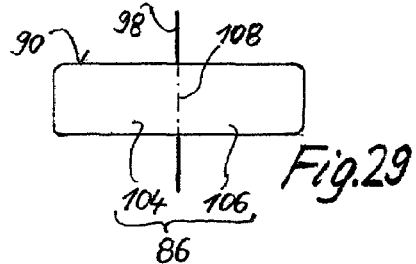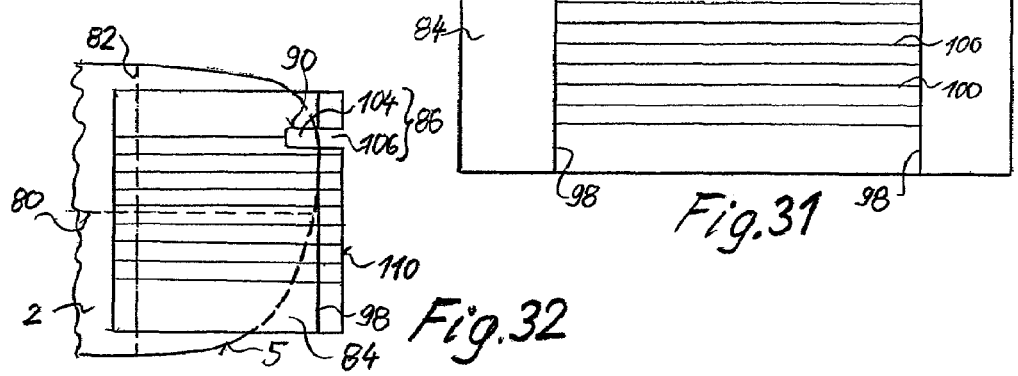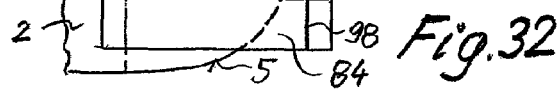

METHOD OF MANUFACTURING RIMLESS SPECTACLES AND A MASK SUITED FOR USE WITH SAID METHOD

FIELD OF THE INVENTION

The invention relates to a method of manufacturing rimless spectacles and a mask for use in said method.

BACKGROUND OF THE INVENTION

Rimless spectacles comprise two spectacle lenses and a bridge disposed between the two lenses and connected thereto, the bridge holding pads or a saddle bridge or is formed integrally with the saddle bridge or the pads. Furthermore rimless spectacles comprise two lugs each of which is connected to either of the two spectacle lenses at a marginal portion of the lens facing away from the bridge and two sides each of which is hingedly connected to either of the lugs. Such rimless spectacles have no mount members extending along the upper edges and/or the lower edges of the spectacle lenses and connecting the bridge to the two lugs. Rather, the coherence between the lugs and the bridge is ensured by the lenses disposed there between. Therefore it is necessary to mechanically connect the lugs and the bridge to the spectacle lenses in a sufficiently strong manner.

It is known to establish the connection between the lugs and the bridge, on the one hand, and the respective spectacle lens, on the other hand, by initially forming at least one through-hole in the lens at the mounting position for the lugs and/or the bridge. A screw or a rivet can be inserted in the through-hole in order to screw or rivet the lug or the bridge with the lens. It is also known to provide at the component to be fixed, i.e. at the lug or the bridge, a pin which is glued or keyed in the through-hole of the spectacle lens. These known ways of connection have the drawback that through-holes have to be formed in the lenses. When forming the through-holes by drilling or milling, for instance, there is the risk that the spectacle lens breaks, which results in considerable rejects during manufacture of such rimless spectacles. Furthermore, the through-holes cause tensions in the spectacle lenses which entail an increased risk of breakage during use of the spectacles.

Moreover it is known in the case of rimless spectacles to bond the bridge and the lugs to the spectacle lenses by means of an adhesive (cf. publications DE 9 402 861 U1, FR 2 793 040 B). In these known rimless spectacles the bridge and the lugs are adhesively bonded to the edges of the lenses. By such bonding of the bridge and the lug to the lenses through-holes shall and can be prevented from having to be formed and being provided in the lenses in order to connect the bridge and the lug to the spectacle lenses.

It has further already been suggested concerning rimless spectacles to adhesively bond the bridge and/or the lugs to the lenses on the front or rear side thereof (cf. publications DE 102005006980 A1, U.S. Pat. No. 5,805,259 A, FR 2 624 278 A1 and FR 2 749 088 A1). When the lugs and the bridge are adhesively bonded to the front or rear side of the lenses, this has the advantage that on the front or rear side a larger joining surface for adhesively bonding is available than at the edges of the lenses which can be narrow when the lenses have a high refractive index. In accordance with publication FR 2 749 088 A1 it is provided that the adhesive is adapted to be hardened by radiation and that the lenses are polished at the mounting positions where fasteners of the lugs and the bridges are to be bonded to the lenses so that the radiation with the aid of which the adhesive is hardened can arrive at the adhesive possibly without being weakened.

Previous efforts to manufacture rimless spectacles by adhesively bonding the lugs and the bridge to the front or rear side of the lenses have not been successful, because no permanently tight adhesively bonded joints could be obtained and the adhesively bonded joints frequently broke.

SUMMARY OF THE INVENTION

The object underlying the invention is to provide a method of manufacturing rimless spectacles in which the bridge and the lugs are connected to the lenses by adhesively bonding the bridge and the lugs to the front side or the rear side of the lenses, wherein the adhesively bonded joints are to be permanently tight and such permanently tight adhesively bonded joints are reliably and regularly achieved.

This object is achieved in accordance with the invention by the method according to claim 1.

Furthermore the mask according to claim 34 belongs to the invention.

In the method according to the invention the coating is removed at the mounting positions for the fasteners of the bridge and the lugs so as to form joining surfaces on the spectacle lenses at which adhesively bonding to the joining surfaces of the lugs and the bridge is performed. In the area of the joining surfaces the basic material of the lenses is exposed by removing the coating at the mounting positions. It has been found that, when the joining surfaces at the lenses have the material quality of the basic material thereof, a permanently tight adhesively bonded joint can be obtained.

The method according to the invention has the fundamental advantage that in the lenses no holes, either through holes or blind holes, or recesses are formed. This avoids the drawbacks that would be caused by drilling or milling the lenses so as to form holes or recesses. As the lenses are neither drilled nor milled, no breakage of the lenses by drilling or milling and corresponding rejects during spectacles manufacture can take place. For the same reason, in the lenses no tensions are induced which might result in breakage of the glass during use of the spectacles. The lenses of the rimless spectacles manufactured according to the invention are free of tensions.

Furthermore, the method according to the invention has the advantage that spectacles having coated lenses can be manufactured according to this method. Coating of the lenses is common today in order to provide the surfaces of the lenses with desired properties such as e.g. dirt-repellent properties and scratch resistance. This means that despite adhesively bonding the fasteners to the front side or the rear side of the lenses, which is advantageous for the reasons discussed hereinafter, it is not necessary to do without coating of the lenses.

It is another advantage of the method according to the invention that the fasteners of the lugs and the bridge are adhesively bonded to the front side or the rear side of the lenses. On the front side and the rear side of the lenses a sufficiently large surface is available for forming the joining surfaces at the lenses so that the joining surfaces at the lenses and at the fasteners of the lugs and bridges can be dimensioned to be sufficiently large so as to obtain a tight adhesively bonded joint. This distinguishes the method according to the invention advantageously from those methods in which the bridge and the lugs are adhesively bonded to the edges of the lenses, because the edges of the lenses are frequently narrow, especially in the case of non-correction glasses, such as e.g. sun glasses, and in the case of correction glasses the lenses of which have a high refractive index. Since, according to the invention, the fasteners of the lugs and the bridge are adhesively bonded to the front side or the rear side of the lenses, forces transmitted from the bridge or the lugs to the lenses result in lower tensions within the lenses than in the case of adhesively bonding the fasteners exclusively or largely to the edges of the lenses. It is made clear that it is not excluded in the method according to the invention that merely in addition the fasteners are bonded also to the edges of the lenses.

Finally, an essential feature and a substantial advantage of the method according to the invention consist in the fact that the coating is removed at the mounting positions to form the joining surfaces at the lenses. It has been found that only by this measure permanently tight adhesively bonded joints are reliably obtained, namely using an adhesive out of the quantity of the existing adhesives known per se.

It can be provided in an advantageous configuration of the invention that the coating is removed by means of a face grinding tool that performs a high-frequency rotation or reciprocating movement in contact with the front or rear side of the lens at a frequency within the range of from 15 to 40 kHz, preferably within the range of from 24 to 30 kHz. It has been found that, when the coating is abraded in this way, the grinding operation can be easily restricted to the abrasion of the usually very thin coating and that the basic material of the lenses is exposed without tensions being produced in the lens.

In an advantageous configuration of the method according to the invention furthermore a mask can be used as auxiliary means when removing the coating to form a respective joining surface at the lens, the mask having an opening whose perimeter corresponds at least partly to the perimeter of the joining surface of a respective fastener. This mask is detachably fixed at the lens in such manner that its opening is provided at the mounting position for the fastener and there delimits the joining surface subject to be formed at the lens. Then the coating is abraded by machining of the front or rear side of the lens in the area delimited by the opening of the mask. Thus the mask determines by its opening in which area at the lens the coating has to be removed to form the joining surface at the same and prevents the coating from being removed outside said area. This renders it especially possible to remove the coating for forming the joining surface at the lens manually, i.e. by means of a tool held and guided by an operating person.

It may be provided in another advantageous configuration of the method according to the invention that the mask does not only serve, during removal of the coating at the lens, for delimiting by its opening the area in which the coating is removed, but further serves as positioning aid for adhesively bonding the fastener to the respective lens. The fastener is adhesively bonded to the lens, while the mask is still detachably fixed at the lens, wherein the fastener is attached to the lens in the area delimited by the opening of the mask fixed at the lens and is adhesively bonded to the same in the thus given relative position with respect to the lens. The edge of the opening is visible and reveals where the fastener has to be attached, during attachment guides the fastener into the opening, and prevents the fastener from getting out of place during setting of the adhesive used for bonding.

In an advantageous configuration of the method according to the invention it may further be provided that each of the lugs and the bridge are manufactured of a basic body and the fastener or fasteners, wherein the fasteners are made of flexible plastic material of low hardness and the basic body is made of a material different from that of the fasteners. This permits to manufacture the basic body of a material, including metal, sufficiently tight as regards the mechanical stresses of the spectacles and to impart to the fasteners a buffer function which protects the adhesive layer between the joining surfaces against impact loads.

Aliphatic thermoplastic polyether urethane has turned out to be an especially suited material of the fasteners and cyanoacrylate adhesive has turned out to be an especially suited adhesive.

Further advantageous configurations of the invention are defined in the dependent claims.

The method according to the invention is applicable both in the manufacture of correction glasses and in the manufacture of glasses having no corrective effect such as sunglasses.

BRIEF DESCRIPTION OF THE DRAWINGS

Hereinafter the invention will be illustrated in detail by way of embodiments with reference to the drawings, in which:

FIG. 1 is a perspective view of a first embodiment of rimless spectacles manufactured according to a method in accordance with the invention;

FIG. 2 is a perspective view of a left-hand lug of the spectacles according to FIG. 1 from the rear;

FIG. 3 is a schematic bottom view, partly in a section, of the left-hand edge portion of the left-hand spectacle lens of the spectacles according to FIG. 1, showing the state adopted by a fastener adhesively bonded to the lens and an allocated body of the lug before being joined;

FIG. 4 shows a representation corresponding to FIG. 3, showing the state after joining the fastener and the body;

FIG. 5 is a perspective view of the left-hand lens of the spectacles according to FIG. 1 from the front including the left-hand lug mounted thereto;

FIG. 6 shows sectional views according to A-A and B-B in FIG. 2;

FIG. 7 shows a block diagram of method steps of the method according to the invention;

FIG. 8 shows a cut-out from a section across a coated lens for the purpose of illustration of a step of the method according to the invention;

FIG. 9 is a perspective view of a lens blank;

FIGS. 13 to 16 show elements of spectacles in accordance with a second embodiment of rimless spectacles manufactured according to the method of the invention;

FIGS. 17 to 20 show elements of a third embodiment of rimless spectacles manufactured according to the method of the invention;

FIG. 21 shows in a perspective view a left-hand lug of a modification of the third embodiment;

FIG. 25 is a top view on a mask according to a first embodiment of the mask according to the invention in connection with a spectacle lens at which the mask is fixed;

FIG. 26 shows the mask according to FIG. 25 in a schematic representation and in a view according to C in FIG. 25;

FIG. 27 is a top view of a second embodiment of the mask according to the invention in a representation similar to FIG. 25;

FIG. 28 is a top view of a third embodiment of the mask according to the invention in a representation similar to FIG. 25;

FIG. 29 shows an opening of the mask according to FIG. 28 in top view and enlarged representation;

FIG. 30 is a perspective cut-out representation of a fastener and the mask according to FIG. 28;

FIG. 31 is a top view of a fourth embodiment of the mask according to the invention which is a modification of the mask according to FIG. 28; and FIG. 32 is a top view of a fifth embodiment of a mask according to the invention in a representation similar to FIG. 25.

DETAILED DESCRIPTION OF THE INVENTION

Figure 10:
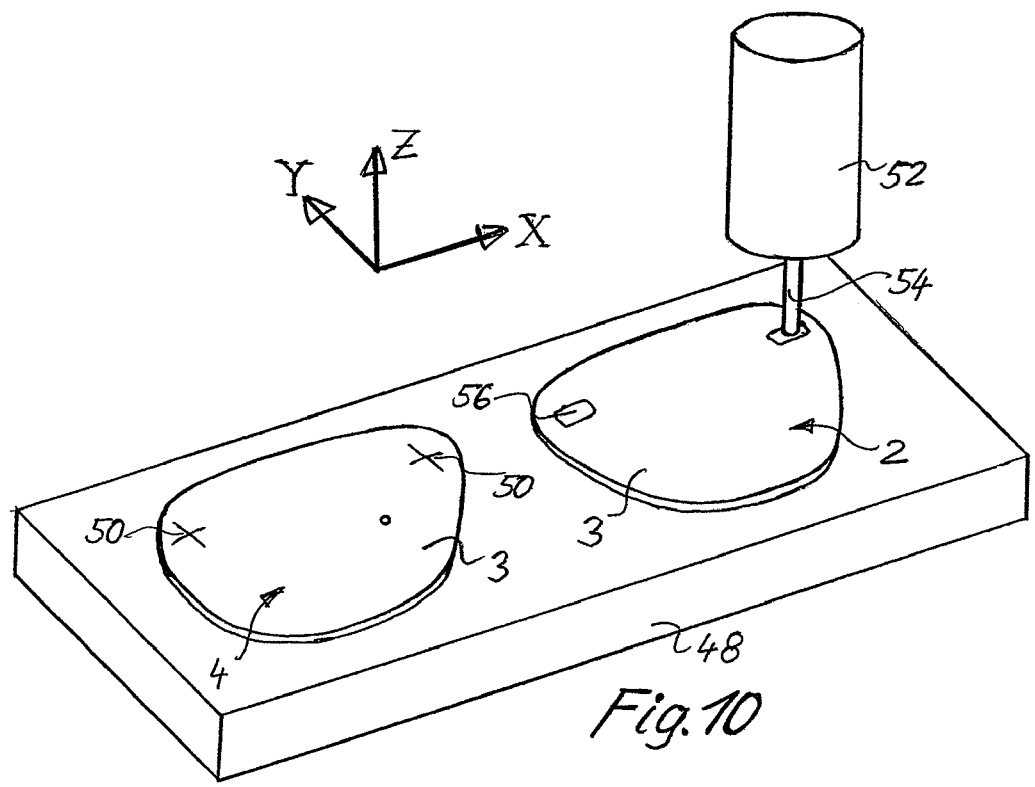
FIG. 10 shows two lenses fixed at a mounting plate in perspective view for the purpose of illustration of steps of the method according to the invention.

Hereinafter at first by way of FIGS. 1 to 6 a first embodiment of rimless spectacles manufactured according to the invention shall be illustrated.

FIG. 1 shows these spectacles in perspective view obliquely from the front. The spectacles comprise a left-hand lens 2, a right-hand lens 4 and a bridge 6 disposed between the two lenses.

Each of the two spectacle lenses 2 and 4 has a front side 3 visible in FIG. 1, a rear side not visible in FIG. 1 and a circumferential edge 5 which delimits the lens radially outwardly with respect to its geometrical and optical centers. The bridge 6 is an elongated element disposed between the two lenses 2 and 4 and interconnecting the latter. The bridge 6 consists of a body 8 and two fasteners not shown in FIG. 1, each of which is disposed at one end of the bridge 6 and is bonded to the front side 3 of the lens 2 and 4, respectively, visible in FIG. 1. A pad member 10 is mounted to the bridge 6 and serves for supporting the spectacles at the nose of the wearer.

The spectacles further comprise a left-hand lug 12 and right-hand lug 14. The lugs 12 and 14 are hingedly connected to a respective side 15 in such manner that the sides 15 can be swiveled from their open positions shown in FIG. 1 into positions in which they extend substantially in parallel to the two lenses 2 and 4.

The lugs 12 and 14 are connected to a respective edge portion of the lenses 2 and 4 facing away from the bridge 6. Each of the two lugs 12 and 14 consists of a body 16 and a fastener 18 (see FIG. 2), the body 16 having a branch 19 arranged on the front side 3 of the allocated lens 2 or 4. In the shown embodiment each of the body 8 of the bridge 6 and the body 16 of the lugs 12 and 14 consists of an injection-molded plastic material, for instance of a polyamide, as it is marketed, for example, under the designation Trogamid by Degussa AG or under the designation Grilamid by Ems-Chemie AG, or of a polyether imide, as it is marketed, for example, by GE Plastics under the brand Ultem.

FIG. 2 shows in a perspective view the left-hand lug 12 and its fastener 18 which serves for connecting the lug 12 to the lens 2 and thus for mounting the lug 12 to the lens 2. The fastener 18 and the body 16 are elements which are initially manufactured separately from each other and are connected to each other in the course of manufacturing the spectacles.

The fastener 18 consists of an injection-molded plastic material, for instance an aliphatic, thermoplastic polyether polyurethane as it is marketed, e.g., by Bayer AG Bayer Polymers under the brand Texin DP7-3006 having a hardness of 50 to 55 Shore D. The fastener 18 has substantially the shape of a cubuid and comprises a plate 20 having a base area 22, an oblong head 24 and an oblong web 26 connecting the plate 20 and the head 24 to each other. In a cross-section perpendicular to its longitudinal direction C the head 24 has the head profile shown in FIG. 6 which is a T-head profile, as it is called. The base area 22 of the plate 20 of the fastener 18 constitutes the adhesive or joining surface thereof, i.e. the surface which is adhesively bonded to a complementary joining surface on the front side 3 of the lens. The base area 22 and thus the joining surface have a perimeter 23 which encloses and delimits the joining surface.

The lug 12 has at its end facing the side 15 a charniere 28 engaged with a pivot pin (not shown) which is formed at the side 15 so that the charniere 28 and the pivot pin form a joint in the form of a pin-joint in which the lug 12 and the side 15 are hingedly connected to each other.

On the rear side of the branch 19 of the body 16 of the lug 12 visible in FIG. 2 in the branch 19 a groove 30 is formed whose profile has a shape complementary to the head profile of the head 24. The groove 30 is closed at its end facing the free end of the branch 19 and is open at its other end so that the head 24 of the fastener 18 can be inserted into the groove.

Within the course of manufacture of the spectacles the fastener 18 is adhesively bonded at a pre-selected mounting position in the edge area of the lens 2 to the front side 3 of the latter. Adhesively bonding the fastener 18 to the lens will be described hereinafter in more detail. FIG. 3 shows the fastener 18 after having been adhesively bonded to the lens 2. Furthermore, FIG. 3 shows the body 16 of the lug 12 in the relative position with respect to the lens 2 and the fastener 18 which the body 16 adopts immediately before being joined to the fastener 18. The joining is performed such that the body 16 is slipped from its position shown in FIG. 3 in the direction of the arrow shown in FIG. 3 toward the fastener 18, wherein the head 24 enters into the groove 30. The body 16 is slipped so far onto the fastener 18 that the fastener 18 and the body 16 adopt their relative position shown in FIG. 4 in which the head 24 of the fastener 18 is completely inserted in the groove 30. The head 24 and the groove 30 are dimensioned such that the surfaces thereof are at least partly adjacent to each other under pressure so that static friction occurs between these surfaces and in this way the fastener 18 and the body 16 are connected by force fit. This connection can be additionally secured by an adhesive.

After having joined the body 16 and the fastener 18 together in the afore-described manner, the arrangement shown in FIG. 5 of the left-hand lens 2 and the left-hand lug 12 mounted thereto is resulting.

The right-hand lug 14 is mounted to the right-hand lens 4 in the same way as described in the foregoing for the left-hand lug 12 and the left-hand lens 2. Further also the bridge 6 is mounted at both of its ends in the same way to the inner edge areas of the lenses 2 and 4, as this has been described before concerning the left-hand lug 12 and the left-hand edge area of the left-hand lens 2.

As one can take from the foregoing description, the lenses 2 and 4 have no through-holes, blind holes or other recesses which have to be drilled or milled. The bridge 6 and the lugs 12 and 14 are mounted to the front sides 3 of the lenses exclusively by adhesively bonding the respective fasteners to the lenses.

In the described embodiment the respective fastener 18 and the corresponding body 8 or 16 are initially separately manufactured elements. This permits and is exploited in the described embodiment to manufacture the body of a material different from the material of the associated fastener. The material selected for the body is expediently a material having sufficient strength as regards the mechanical loads of the spectacles. The material selected for the respective fastener is a material softer and more elastic than that of the body so that the fastener has a buffer or damping function which protects the adhesive layer between the joining surfaces against impact loads and in this way prevents a breakage of the adhesively bonded joint. Preferably, as this is the case with the described embodiment, the respective fastener is adhesively bonded to the lens before the body of the lug and the bridge is connected to the fastener. This facilitates adhesive bonding of the fastener to the spectacle lens. The buffer or damping function is also present, however, when the fastener is connected to the body before being adhesively bonded to the lens or when, as also possible, the fastener is injection-molded at the corresponding body by an injection molding process in the course of manufacture of the bridge and the lugs.

In the afore-described embodiment the fasteners 18 are glued to the front sides 3 of the lenses 2 and 4 and, accordingly, the branches 19 of the lugs 12 and 14 as well as the ends of the bridge 6 are disposed on the front sides 3 of the lenses. In deviation hereof, the fasteners 18 can also be glued to the rear sides of the lenses and the branches of the lugs and/or the ends of the bridge can be correspondingly disposed on the rear sides. However, it is preferred to adhesively bond the fasteners to the lenses on the front sides thereof, because in the case of spectacle lenses having a different corrective effect the differences between the curvatures of the front sides are smaller than the differences between the curvatures of the rear sides.

Hereinafter, with reference to the FIGS. 7 to 12, the method according to the invention for the manufacture of rimless spectacles will be illustrated by way of examples. FIG. 7 shows in the form of a block diagram the basic method steps taken in the method according to the invention.

In a first step S1 two lens blanks are made of a plastic material by casting or molding, for instance. As plastic material, i.e. as basic material of the lenses to be manufactured, the plastic materials common for spectacle lenses are considered, as for example polycarbonates and allyl diglycol carbonate known as spectacle lens material under the designation CR39.

In a subsequent second step S2 a coating is applied to the front side and the rear side of each lens blank. The coating 32 usually consists of plural layers, as shown in FIG. 8. For instance, a Hard Coat 36, as it is called, which is to ensure the scratch resistance of the surfaces (front and rear sides) of the lenses, is initially applied by immersion to the basic material 34 of which the lens blanks consist. Then by evaporation a coating layer 38 which in turn may consist of plural layers can be applied to the hard layer 36. The coating layer 38 is to suppress regular reflection. As an alternative, a reflective layer can be applied, if a high degree of reflection is desired. The uppermost layer applied is a dirt-repelling layer 40, for instance, which has hydrophobic and oleophobic characteristics and is to prevent dirt from adhering. The total thickness of the coating is within the range of less than 1 μm to few micrometers.

In the subsequent layer S3 the desired lens shape is formed at the coated lens blanks. For this purpose each coated lens blank 42 having a circular edge is usually mounted to a lens clamp 44 (cf. FIG. 9) so that by milling and grinding of the lens blank 42 so much of the material thereof is removed that a spectacle lens having the desired lens shape is obtained. The desired lens shape 46 is shown in broken line in FIG. 9. Usually the geometric shape of the edge of a lens is referred to as lens shape. As a result of milling and grinding of the respective lens blank 42 the two lenses 2 and 4 of the afore-described embodiment, for example, obtain the edges 5.

The lens blank 42 and also the lens having the lens shape 46 have a datum line 80 and a lens vertical 82. The datum line 80 passes through the (not shown) optical center of the lens and connects the optical centers of the two lenses of the finished spectacles. The lens vertical 82 vertically intersects the datum line 80 in the geometric center of the respective lens. The datum line 80 and the lens vertical 82 are auxiliary lines that can be marked at the lens blanks 42, wherein the respective markers are removed when they are no longer required and are no longer visible at the finished spectacles.

Furthermore, in a step S6 one bridge and two lugs are manufactured for each pair of spectacles. The bridge and the lugs, for instance, have the design and the nature as described before concerning the first embodiment of the spectacles. The fasteners 18 are manufactured by injection molding of an injection-moldable plastic material. If, as this is the case with the first embodiment of the spectacles, the bodies of the lugs and the bridge are equally made of plastic material, they, too, are injection-molded of an injection-moldable plastic material. As an alternative, however, the bodies can also be manufactured of a metallic material according to common metal machining processes. In the afore-described first embodiment of the spectacles the fasteners and the bodies are initially manufactured as separate elements which are positively or non-positively connected to each other only after adhesively bonding the fasteners to the front or rear side of the lenses. As already mentioned, this connection can be established already before adhesively bonding the fasteners to the lenses. It is further possible to attach the fasteners to the respective pertinent body, irrespective of whether it consists of a plastic or a metallic material, by an injection-molding process and to partly or completely cover the body with the material of the fastener. Finally each bridge including its two fasteners and each lug including its fastener can be injection-molded in one piece of a plastic material. In each of the above-considered cases, at the respective fastener a substantially even joining surface is formed which is intended to be tightly adhesively bonded to a complementary joining surface on the front side or the rear side of either of the two lenses. In the afore-described first embodiment the base area 22 of the plate 20 of the fastener 18 forms such joining surface with the perimeter 23.

After having manufactured the two lenses with their desired lens shape, the bridge including its two fasteners and the two lugs including their respective fastener, the fasteners are adhesively bonded to the front sides of the lenses. For this purpose, the two lenses 2 and 4 are first fixed on a mounting plate 48, for instance by means of not shown pneumatic holding devices, as illustrated in FIG. 10. The two lenses adopt a predetermined relative position having a predetermined bridge width between the lenses.

In a step S4 then the mounting positions for the fasteners of the lugs and the bridge are determined at the lenses, wherein said mounting positions are located at the front sides 3 of the lenses 2 and 4 in the first embodiment. In FIG. 10 the mounting positions 50 are shown at the right-hand lens 4 by cross-shaped markers applied to the lens. It is made clear, however, that it is not necessary to form such visible markers at the lenses. Rather, it is sufficient and preferred to determine the mounting positions by programming their position in a threedimensional coordinate system (cf. the X-Y-Z coordinate system in FIG. 10) in and by means of a not shown programmed control apparatus.

After having determined the mounting positions for the fasteners of the lugs and the bridge, in a step S5 the coating is removed at the mounting positions, that is in the area of the mounting positions, so as to form joining surfaces at the lenses 2 and 4. The purpose of removing the coating consists in exposing the base material of the lenses so that the respective joining surface at the spectacle lens has the material condition of the base material of the lens. Accordingly, in the area of the joining surface to be formed the coating is completely removed, i.e. up to the total thickness of the coating. It is neither necessary nor intended that also base material is removed. If, however, simultaneously with the removal of the coating also base material is removed to a small depth—to a depth of few micrometers—this has turned out to be harmless.

For removing the coating in the area of the joining surfaces to be formed basically any method is suited by which the coating can be removed in a defined area and substantially restricted to the thickness of the coating.

For example, the coating can be removed by abrasive-blasting finest abrasive particles, for instance abrasive particles in the form of glass powder. In this event, it is useful to cover the lenses in the area outside the joining surfaces to be formed by means of a film.

Further the coating can be abraded, for instance, by means of a laser tool generating a laser beam which is focused onto the joining surface to be formed and is moved over the entire area of the joining surface to be formed. The energy of the laser beam and the penetration depth thereof can be exactly dosed so that in the desired manner merely the coating is removed without any significant amount of base material being removed. A particularly precise material removal without a melting phase is possible by ultra-short laser pulses.

It has turned out to be advantageous to remove the coating by means of a grinding tool which performs a high-frequency rotation or reciprocating movement at a frequency within the range of from 24 to 30 kHz.

Figure 11:
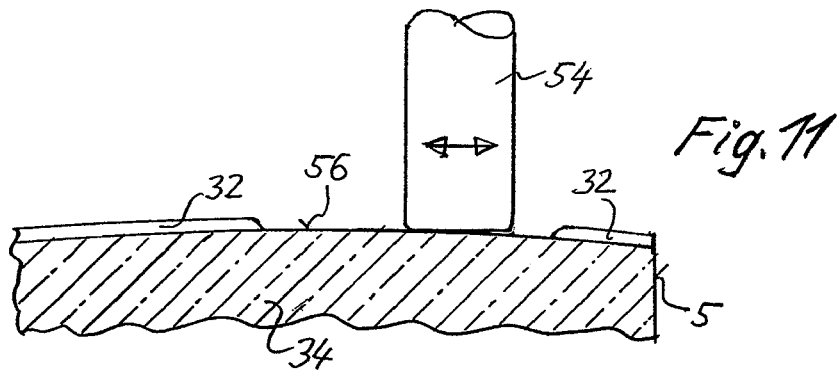
FIG. 11 shows a cut-out from a section across a lens for the purpose of illustration of a step of the method according to the invention.

This is schematically illustrated in FIGS. 10 and 11. A grinding device comprises a drive unit 52 and as grinding tool a face grinding tool 54 supported by the drive unit. The grinding device is moved to the respective mounting position by control of the programmed control apparatus in the X-Y plane. In FIG. 10 this is the mounting position for the lug at the left-hand lens 2. At the mounting position the grinding device is lowered in the Z-direction until the end face of the face grinding tool 54 is in contact with the lens with low contact force. The face grinding tool 54 performs a high-frequency movement, for instance a pendulum movement in the Y-direction at a frequency of 28 kHz. In so doing, the face grinding tool 54 is displaced in zigzag, for instance, in the Y-direction and in the X-direction over the entire area of a joining surface to be formed so that finally a joining surface is formed at the lens which is substantially equal as to shape and dimensions to the joining surface at the fastener. By way of example, FIG. 10 shows a joining surface 56 for the left-hand fastener of the bridge. The contact force of the face grinding tool 54 and the machining time by grinding are established by preliminary tests and are determined such that, as already described, the coating 32 is completely abraded in the area of the joining surface 56 to be formed without a significant amount of base material being abraded.

It has turned out that, when the coating is abraded as described above by grinding at high frequency, homogenous joining surfaces of microscopic roughness can be formed without tensions being produced in the base material of the lenses. During grinding at high frequency the spectacle lenses are not made to vibrate, whereby an unevenness of the joining surfaces is prevented. Moreover, the described proceeding permits an economic manufacture of spectacles, because the entire grinding operation can be automated and requires only a short machining time of few seconds.

After having formed, in step S5, the joining surfaces by locally removing the coating and after having manufactured, in step S6, the lugs and the bridge, in step S7 the bridge, the lugs and the lenses are adhesively bonded to one another.

During bonding, the lenses 2 and 4 having the joining surfaces formed at the same preferably remain fixed to the mounting plate 48 at which they have been fixed for the purpose of forming the joining surfaces. It has further turned out to be expedient to roughen the joining surfaces of the fasteners, namely for instance the base area 22 of the fasteners 18 of the first embodiment of the spectacles, prior to bonding. As an alternative to mechanical roughening by grinding, the adhesive property of the fasteners can be increased by pretreating the joining surfaces thereof with acetone by brushing the joining surfaces with a sponge or the like soaked with acetone.

Figure 12:
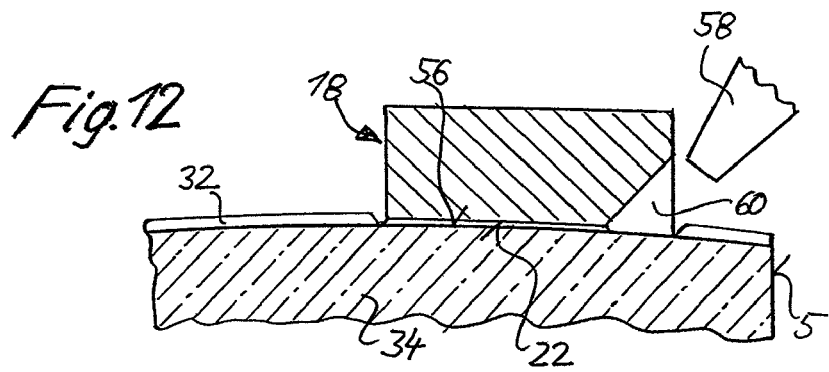
FIG. 12 shows a cut-out from a section across a lens for the purpose of illustration of a further step of the method according to the invention.

Although it is possible to apply the adhesive used for adhesively bonding, for instance cyanoacrylate adhesive, to the joining surface of the respective fastener 18 or the joining surface 56 at the lens, before the fastener is arranged at the allocated mounting position, it is preferred, however, to proceed in a way that initially the respective fastener 18 is arranged and pressed on at the allocated mounting position, as shown in FIG. 12, before the adhesive is introduced between the joining surface 56 at the lens and the joining surface at the fastener 18. In this case, the adhesive is introduced by a dosing means of which merely a nozzle 58 is shown in FIG. 12. In order to facilitate positioning the nozzle 58 and introducing the adhesive the respective fastener 18 can be provided with a recess 60, as shown in FIG. 12. The adhesive introduced in a dosed quantity is spread due to the capillary forces acting in the gap between the two joining surfaces as thin adhesive layer and remains restricted to the gap area between the two joining surfaces, because no capillary forces act outside this gap area. By virtue of this effect and the exact dosage of the adhesive a clean adhesively bonded joint is obtained, i.e. an adhesively bonded joint in which practically no adhesive is provided outside the area in which the two joining surfaces overlap.

As already mentioned, the preferred adhesive used is, for example, a cyanoacrylate adhesive of medium viscosity having a viscosity within the range of 120 MPa☐s at 20° C. or—preferably—of low viscosity having a viscosity within the range of 7 MPa☐s at 20° C. The time during which the fastener and the lens have to be pressed together during bonding are few seconds in the case of these adhesives so that also bonding can be carried out economically and within short time.

After, in step S7, all four fasteners 18 have been adhesively bonded to the two lenses 2 and 4 in the afore-described manner, the fasteners are connected to the bodies of the lugs and the bridge in the manner already described above in the description of the first embodiment of spectacles manufactured according to the invention so that a finished spectacle front consisting of the two lenses, the bridge and the lugs is provided. By adjoining the pad member and the sides the spectacles are completed to form the finished rimless spectacles.

Hereinafter further embodiments of rimless spectacles manufactured according to the invention shall be illustrated by way of the FIGS. 13 to 21. The FIGS. 13 and 17 show a perspective view of the body 16 and the fastener 18 of the left-hand lug 12 of the respective embodiment. The FIGS. 14 and 18 show in a way similar to FIG. 3 a schematic bottom view of the left-hand edge area of the left-hand lens 2, wherein the state is shown which is adopted by the fastener 18 glued to the lens 2 and the allocated body 16 before they are joined. The FIGS. 15 and 19 show in a way similar to FIG. 4 a bottom view in which the state after joining the fastener 18 to the body 16 is represented. The FIGS. 16 and 20 show in a way similar to FIG. 5 a perspective view of the left-hand lens 2 from the front with the left-hand lug 12 mounted thereto. FIG. 21 shows a lug of a modification of the embodiment according to FIGS. 17 to 20.

Those elements of the further embodiments which coincide with elements of the first embodiment of the spectacles manufactured according to the invention or correspond to elements of the first embodiment are denoted with the same reference numbers as in the first embodiment.

In the second embodiment according to FIGS. 13 to 16 the body 16 of the lug 12 is an injection-molded plastic member having a design similar to the body 16 of the first embodiment. In deviation from the first embodiment, the body 16 of the lug in the second embodiment has at the free end of the branch 19 an end face at which a hook 62 including two click-stop detents 64 is integrally formed.

The fastener 18 is an injection-molded plastic member and substantially has the shape of a cuboid including an integrally formed projection 66 protruding at one end of the base area 22 from the latter. In the fastener 18 a recess 68 having two undercuts is formed. The design of the recess 68 and its undercuts is adapted to the design of the hook 62 such that the hook 62 is adapted to engage and lock in the undercuts with its click-stop detents 64.

After having adhesively bonded the fastener 18 to the left-hand lens 2, it is joined together with the body 16 by sliding the hook 62 from the position shown in FIG. 14 into the recess 68 until the position according to FIG. 15 is reached. The fastener 18 is elastically widened until at the end of the inserting operation the click-stop detents 64 can engage in the undercuts of the recess 68 so that a positive locking connection is brought about due to this engagement.

In this second embodiment the fastener 18 comprises the projection 66 which encompasses the edge 5 of the spectacle lens 2. The fastener 18 is not only adhesively bonded at its base area 22 to the front side 3 of the lens 2 but is also adhesively bonded at the inside 70 of the projection 66 to the edge 5. However, this is merely an additional adhesively bonding the joining surfaces of which are substantially smaller than the joining surfaces on the front side 3 of the lens 2. In order to permit this additional adhesive bonding it is not necessary to remove a coating at the edge 5 of the lens, because there the base material of the spectacle lens is exposed anyway after forming the lens shape.

In the third embodiment according to FIGS. 17 to 20 the body 16 of the lug is a component made of metal having the configuration shown in FIG. 17. The body 16 of the lug consists of two curved rods 72 which are parallel to each other and at their one ends are merged into each other forming the charniere 28 and are firmly connected to an oval plate 74 at their other ends.

The fastener 18 of the third embodiment is an injection-molded plastic member having an oval base area and an arched surface so that in total it has the shape of an oval lens. The fastener 18 is adhesively bonded at its base area to the front side 3 of the lens 2 and includes a slit 76 extending substantially in parallel to its base area. The shape and the dimensions of the slit 76 are adapted to the shape and the dimensions of the plate 74 and to the ends of the rods 72 connected thereto in such way that the plate 74 can be inserted in the slit 76 so that the relative arrangement of the fastener 18 and the body 16 according to FIG. 19 is resulting. In the state shown in FIG. 19 a projection formed at the fastener 18 and protruding into the slit 76 thereof engages in a hole in the plate 74 so that in this way a positive connection between the fastener 18 and the body 16 of the lug is ensured.

As illustrated by FIGS. 18 and 19, in the third embodiment the joining surfaces at the fastener 18 and at the lens 2 extend to the edge 5 thereof.

While in the first embodiment the fastener 18 is disposed on the side of the branch 19 of the body 16 facing the spectacle lens, in the second and third embodiments the fastener 18 is designed such that it completely surrounds the hook 62 at the end of the branch 19 and the one end of the body 16, respectively. In this way, the fastener of the second embodiment and of the third embodiment forms a shoe into which one end of the body is plugged. Analogously to the fastener 18 of the first embodiment, this shoe is manufactured of a flexible plastic material of lower hardness than that of the material of the body so that this shoe has the already afore-discussed damping or buffer function and protects the adhesive layer of the adhesively bonded joint against impact loads.

In modification of the third embodiment, in which the fastener 18 and the body 16 of the lug 12 are plugged together after the fastener 18 has been bonded to the front side 3 of the lens 2, the fastener having the same external shape as shown in FIG. 17 can be attached to the body 16 by injection-molding. As a result of the attachment by injection-molding the lug 12 shown in FIG. 21 is formed. The fastener 18 and the body 16 are in this case already firmly connected to each other before the fastener 18 is adhesively bonded to the front side 3 of the lens 2.

As regards the method of manufacturing the spectacles according to the second embodiment and the third embodiment, the foregoing explanations concerning the manufacturing method according to the invention are applicable.

Figure 22:
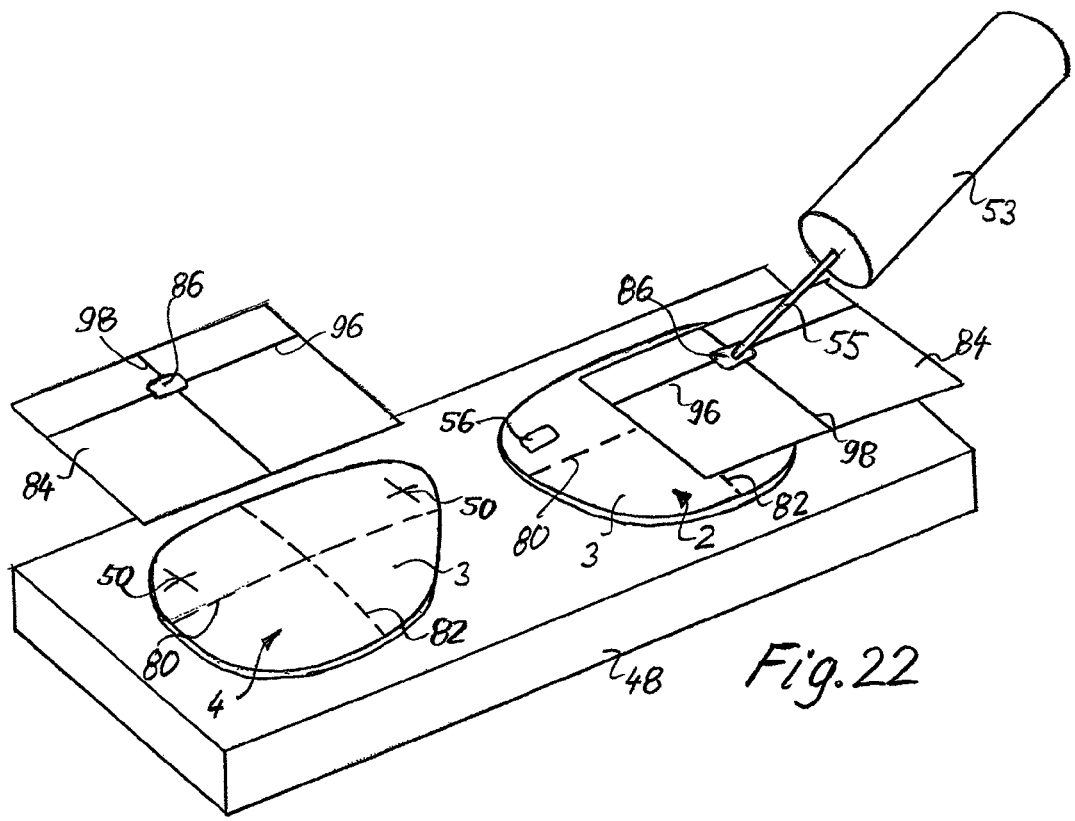
FIG. 22 shows in a perspective view two lenses fixed at a mounting plate for the purpose of illustration of steps of a specific embodiment of the method according to the invention.
Figure 23:
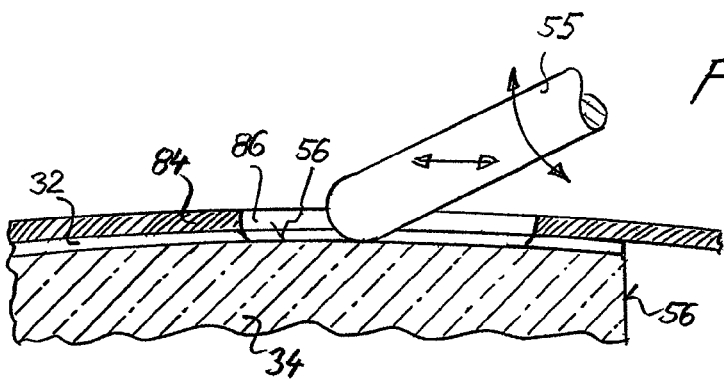
FIG. 23 shows a cut-out from a section across a lens for the purpose of illustration of a step of the specific embodiment of the method according to the invention.

Hereinafter a specific embodiment of the method according to the invention shall be illustrated with reference to the FIGS. 22 to 24 which excels by the fact that a mask is applied and that the coating is removed by an abrasive treatment. The above explanations concerning the steps S1 to S3 and S6 also apply to this specific embodiment. The above explanations concerning the steps S4, S5 and S7 are analogically applicable to the specific embodiment, unless hereinafter anything to the contrary is described.

As explained already in the foregoing, in step S4 the mounting positions for the fasteners of the lugs and the bridge at the lenses are determined, wherein these mounting positions for the first embodiment of spectacles manufactured according to the invention are located on the front sides 3 of the lenses 2 and 4. To this effect, in the specific embodiment cross-shaped markers are applied to the lenses at the mounting positions 50, as shown in FIG. 22 for the right-hand lens 4. Each mounting position 50 has predetermined distances from the datum line 80 and the lens vertical 82. These distances are predetermined in dependence on the desired lens shape 46 in combination with the desired spectacle design.

In the subsequent step S5 the coating at the mounting positions 50, that is in the area of the mounting positions 50, is removed by an abrasive treatment so as to form the joining surfaces at the lenses 2 and 4.

Before in step S5 the coating is removed in the area of the mounting positions, in the specific embodiment of the method according to the invention a mask 84 having an opening 86 is detachably mounted to the respective lens 2 or 4. Such mask 84 is shown in FIG. 22 above the mounting position 50 for the fastener of the right-hand lug. From the position shown in FIG. 22 the mask 84 is lowered until it is adjacent to the front side 3 of the lens and is pressed against the same so as to fix the mask 84 at the lens by adhesion. The mask 84 is fixed at the respective lens in such relative position between the mask 84 and the lens that the opening 86 of the mask 84 is located at the previously determined and marked mounting position 50 for the respective fastener and there delimits the joining surface still to be formed at the lens 2 and/or 4.

The opening 86 in the mask 84 has a contour 90 (cf. FIG. 25) which coincides with the perimeter of the joining surface of the respective fastener. This means, for example in the case of the fastener 18 shown in FIG. 2, that the opening 86 has a contour 90 which coincides with the substantially rectangular perimeter 23 of the joining surface formed by the base area 22 of the fastener 18, so that the opening has the same shape and size as the joining surface. It is made clear that within the scope of the present description and claims the contour of the opening 86 has to be deemed to coincide with the perimeter of the joining surface of the fastener, even if this contour substantially coincides with the perimeter of the joining surface, especially if the opening 86 delimited by the contour is somewhat or a little larger all over than the joining surface of the fastener.

In the FIGS. 25 and 26 an embodiment of the mask 84 is shown, wherein FIG. 25 illustrates a top view of the mask 84 in its state fixed at the spectacle lens 2. FIG. 26 shows the mask 84 in a view according to C in FIG. 25, wherein the mask 84 is shown schematically having an exaggerated thickness in FIG. 26.

The mask 84 substantially consists of a flexible, rectangular cut sheet 88. The sheet 88 may be a sheet of paper which is painted, coated or impregnated with a plastic material and thus is sufficiently resistant. Preferably the sheet 88 is formed by a transparent plastic film and has a thickness within the range of from 0.1 mm to 0.3 mm, especially a thickness of 0.15 mm. Polycarbonate has been found to be an especially suited material for the plastic film.

In the sheet 88 the opening 86 is formed the contour 90 of which substantially coincides with the joining surface of either of the fasteners in a way described already in the foregoing.

The mask 84 must be detachably mountable to the front side or rear side of the lens. For this purpose one surface of the sheet 88 exhibits adhesive properties. In the embodiment shown in FIGS. 25 and 26 the sheet 88 is provided with a removable adhesive layer 92 which ensures the adhesive properties of the one surface of the sheet 88. A cover film 94 covers the removable adhesive layer 92. Before the mask 84 is fixed at the respective lens 2 or 4, the cover film 94 is removed from the removable adhesive layer 92 and the cover film 94 is a part of the mask 84 only until this point in time.

The sheet 88 and thus the mask 84 are provided with a horizontal marker line 96 and a marker line 98 normal thereto. These two marker lines 96 and 98 intersect in the center of the opening 86 and facilitate disposing the opening 86 of the mask 84 during fixture of the same at the lens 2 or 4 such that the marker defining the mounting position 50 for the respective fastener is in the center of the opening 86, as shown in FIG. 25. The horizontal marker line 96 then is the line which, after having mounted the mask 84 to the lens 2 or 4, is to extend in parallel to the datum line 80 of the lens. In order to facilitate this parallel alignment and thus the correct positioning of the opening 86 at the lens 2 or 4, the mask further includes an array of reference lines 100 parallel to one another and to the horizontal marker line 96 which preferably have equal distances from one another.

When the mask 84 has been fixed at the lens 2, for instance, in the above-described manner, at the latter it delimits the area within which the joining surface is to be formed at the lens. This is shown, by way of example, in FIGS. 22 and 25 for the lens joining surface for the fastener of the left-hand lug. Thus the design and the size of the joining surface to be formed at the mounting position 50 are defined by means of the mask 84 and its opening 86. Outside the area delimited by the opening 86 the mask 84 covers the respective lens.

In step S5 the coating is then removed by an abrasive treatment of the front side 3 or the rear side of the lens in the area delimited by the opening 86 of the mask 84 detachably fixed at the lens. The mask 84 prevents abrasion of the coating outside this area.

For removing the coating by the abrasive treatment basically each method is suited by which the coating can be abraded substantially restricted to the thickness of the same. The abrasive treatment can be performed by means of a tool having a geometrically indefinite cutting edge, for instance by means of a grinding tool, or by means of a tool having a geometrically defined cutting edge, namely by a milling cutter or a scraping tool, for instance.

As already explained in the foregoing in connection with FIGS. 10 and 11, it has turned out to be of advantage to remove the coating by means of a grinding tool which performs a high-frequency rotation or reciprocating movement at a frequency ranging from 24 to 30 kHz. This is schematically shown in FIGS. 22 and 23 for the specific embodiment. A grinding device comprises a drive unit 53 having a motor and a grinding tool 55 supported by the drive unit 53 in the form of an abrasive pencil comprising a head which bears abrasive grains. The grinding device is held and guided manually by an operating person, for instance. The drive unit 53 rotates the grinding tool 55 at a frequency of 28 kHz, for example, in one way or alternately to and fro. The head of the grinding tool 55 is put on the front side 3 of the lens within the area delimited by the opening 86, is slightly pressed on there and is moved over the entire area delimited by the opening 86 (see FIG. 23). The edge of the opening 86 can be utilized as a guide. In this way, finally a joining surface results at the lens which is equal to the opening 86 as to shape and dimensions and thus coincides with the joining surface of the respective fastener as to form and dimensions, because the contour 90 of the opening 86 coincides with the perimeter of the joining surface of the fastener. The mask 84 covering the lens outside the area delimited by the opening 86 prevents abrasion of the coating outside this area, if the operating person moves the grinding tool 55 beyond the edge of the opening 86. Such movement beyond the edge of the opening 86 is impeded by the edge anyway.

It has turned out that when the coating is abraded in the above-described manner by high-frequency grinding, homogenous joining surfaces having a microscopic roughness can be formed without tensions being produced in the base material of the lenses. During grinding at high frequency the spectacle lenses are not made to vibrate, thereby preventing an unevenness of the joining surfaces.

In deviation from the above-described abrasion of the coating using a grinding device the grinding tool of which is driven by a drive unit, the relative movement between the grinding tool—or another tool suited for the abrasive treatment—and the front or rear side of the lens which is necessary for abrading the coating can be exclusively brought about by the operating person. In other words, the abrasion can be carried out purely manually. In this case, for instance, the grinding tool 55 is not provided with the drive unit 53 but merely with a handle. The operating person holds the grinding tool 55 by means of the handle and carries out all movements required for abrading the coating by hand.

After, in step S5, all required joining surfaces have been formed by the abrasive treatment utilizing the mask 84 and after, in step S6, the lugs and the bridge have been manufactured, in step S7 the fasteners of the bridge and the lugs are adhesively bonded to the lenses. With respect to step S7, the above explanations apply to this step mutatis mutandis.

In order to adhesively bond the fasteners to the lenses, the fasteners are disposed at the respective allocated mounting position on the spectacle lenses. This can be done after the mask with the aid of which the joining surface has been formed at the respective mounting position has been removed from the respective lens. Preferably, however, the mask 84 is utilized as positioning aid during attaching the fastener and during bonding to the lens. In other words this is to say that the respective fastener 18 is adhesively bonded to the lens 2 or 4 while the mask 84 is still fixed at the lens, wherein the fastener 18 is attached to the lens in the area delimited by the opening 86 of the mask 84 and is adhesively bonded to the lens in the position relative to the latter given thereby, as is illustrated in FIG. 24. The opening 86 in the mask 84 thus defines where the fastener has to be attached and the edge of the opening 86 guides the fastener during attachment and prevents the fastener from being displaced at the lens during bonding. In this case the mask 84 is withdrawn or removed from the lens only after adhesively bonding the fastener to the latter.

Figure 24:
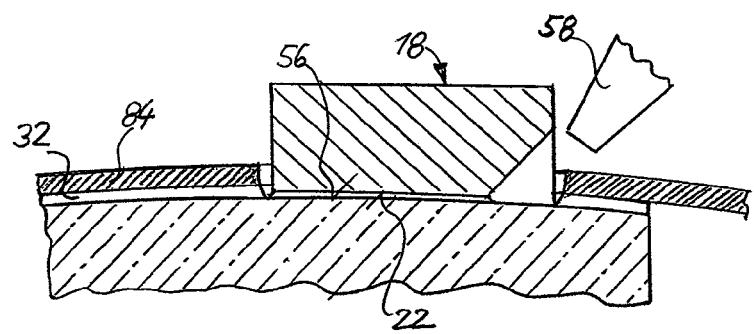
FIG. 24 shows a cut-out from a section across a lens for the purpose of illustration of a further step of the specific embodiment of the method according to the invention.

Although it is possible to apply the adhesive used for bonding, for instance cyanoacrylate adhesive, to the joining surface of the respective fastener 18 or the joining surface 56 at the lens, before the fastener is attached to or disposed at the allocated mounting position, it is preferred in the specific embodiment, however, to proceed in the way that, as shown in FIG. 24, first the respective fastener 18 is arranged at and pressed onto the allocated mounting position—namely preferably using the mask 84 as positioning aid—before the adhesive is introduced between the joining surface 56 at the lens and the joining surface at the fastener 18. As explained already by way of FIG. 12, the adhesive is introduced by a dosing means of which merely the nozzle 58 is shown in FIG. 24. In order to facilitate positioning the nozzle 58 and introducing the adhesive the respective fastener 18 can be provided with the recess 60, as shown in FIG. 24.

After, in step S7, having adhesively bonded all four fasteners 18 to the two lenses 2 and 4 in the above-described manner, the fasteners are connected to the bodies of the lugs and the bridge in the way described already in the foregoing description of the first embodiment of spectacles manufactured according to the invention, so that a finished spectacle front consisting of the two lenses, the bridge and the lugs is provided. The spectacles are completed to form finished rimless spectacles by attaching the pad member and the sides.

The specific embodiment of the method according to the invention is also suited for manufacturing rimless spectacles according to the further embodiments illustrated by way of FIGS. 13 to 21 of spectacles manufactured according to the invention.

In the foregoing it is described concerning the specific embodiment of the method according to the invention that the lenses 2 and 4 are fixed at the mounting plate 48 when the steps S4, S5 and S7 are implemented. In deviation from that, these steps can also be taken without fixing the lenses 2 and 4 at a mounting plate. When the steps S4, S5 and S7 are implemented, each of the two lenses 2 and 4 can be individually held by hand, i.e. manually, and/or can be pressed against a support. Neither determining the mounting positions for the fasteners on the front or the rear side of the lenses nor fixing the mask at the same does require a prior fixing of the lenses at a mounting plate. After fixing the mask at the respective spectacle lens, the opening of the mask clearly defines the area in which the coating has to be abraded for forming the respective joining surface at the lens and the respective fastener has to be adhesively bonded. Therefore also the steps S5 and S7 require no prior fixing of either of the lenses or of both lenses at a mounting plate or in a mounting device.

In the foregoing it is further described concerning the specific embodiment of the method according to the invention that in step S4 the mounting positions for the fasteners are determined at the lenses, before the mask 84 is fixed at the respective lens. In deviation therefrom, it may be and preferably is provided that already the determination of the mounting position for a respective fastener at the lens is performed with the aid of the mask 84 so that it is superfluous to determine and mark the mounting position at the lens before fixing the mask 84 at the lens. This will be described in detail hereinafter by way of FIG. 27.

FIG. 27 shows another embodiment of the mask 84 which is a modification of the embodiment according to FIGS. 25 and 26. In addition to the arrangement of the reference lines 100 parallel to the horizontal marker line 96, the mask 84 of this embodiment shows a second arrangement of reference lines 102 parallel to one another which extend normally to the reference lines 100 of the first arrangement and thus in parallel to the vertical marker line 98. Just as the horizontal marker line 96 and the reference lines 100 parallel thereto, the vertical marker line 98 and the reference lines 102 parallel thereto have a predetermined distance a from one another which is 2 mm, for instance.

As already stated before, each mounting position has distances predetermined by the desired lens shape and the desired spectacle design from the lens vertical 82 and the datum line 80. The mask 84 according to FIG. 27 permits to fix the mask 84 at the respective lens in such relative position with respect to the same that the center of the opening 86 of the mask 84 is provided in the distances predetermined for the respective mounting position from the lens vertical 82 and the datum line 80. If, for instance, the mounting position, that is the center thereof is to have a distance of 8 mm from the datum line 80, the mask 84 is fixed at the lens such that the datum line 80 coincides with that of the reference lines 100 having the distance of 8 mm from the horizontal marker line 96. If the mounting position, that is the center thereof is to have, for instance, a distance of 16 mm from the lens vertical 82, the mask 84 is fixed at the lens such that the one of the vertical reference lines 102 which has a distance of 16 mm from the vertical marker line 98 coincides with the lens vertical 82. Accordingly, the opening 86 of the mask 84 is positioned exactly at the predetermined mounting position and this mounting position is determined by fixing the mask 84 at the lens and by means of the opening 86 of the mask 84. Therefore it is superfluous to determine the mounting position at the lens and to identify it by a marker, for example, before the mask 84 is fixed at the lens.

In the embodiments of the mask 84 according to FIGS. 25 to 27 the contour 90 of the opening 86 in the mask 84 completely coincides with the perimeter of the joining surface of the respective fastener, i.e. along the entire perimeter. Deviating from that, the opening 86 in the mask 84 can be formed such that its contour 90 coincides only partly with the perimeter of the joining surface of a respective fastener, wherein a portion of the opening 86 has a contour, however, which completely coincides with the perimeter of the joining surface of the respective fastener. The FIGS. 28 to 30 exhibit an embodiment of the mask 84 including such opening.

In the embodiment according to FIGS. 28 to 30 the opening 86 has a substantially rectangular or longitudinal-oval contour 90 and comprises a first portion 104 as well as a second portion 106 which are directly merging at a boundary line 108. This imaginary boundary line 108 connects the two portions of the vertical marker line 98 interrupted by the opening 86. In the mask 84 this vertical marker line 98 does not extend through the center of the joining surface to be produced by abrading the coating inside the area restricted by the opening 86 but along a margin of said joining surface.

The first portion 104 of the opening 86 is restricted by the boundary line 108 and a portion of the contour 90 of the opening 86, namely the portion of the contour 90 in FIG. 29 extending on the left from the boundary line 108. This portion of the contour 90 and the boundary line 108 consequently form the contour of the first portion 104 and this contour of the first portion 104 coincides with the perimeter of the joining surface of the fastener. Accordingly, it is not the entire contour 90 of the opening 86 which coincides with the perimeter of the joining surface of the fastener, but merely said portion of the contour 90 coincides with a portion of the perimeter of the joining surface of the fastener.

The second portion 106 of the opening 86 can be shaped symmetrically with respect to the first portion 104 concerning the boundary line 108, as represented in FIGS. 28 and 29. This is not imperative, however. As the second portion 106 does not serve for restricting the area in which the joining surface has to be formed at the lens by abrading the coating, the second portion 106 can be larger especially all over than the first portion 104.

The embodiment of the mask 84 according to FIGS. 28 to 30 is suited and intended to form such joining surfaces at the lens which extend to the edge thereof. Said mask 84 therefore is especially suited for use in the manufacture of spectacles the fasteners of which are designed according to the second embodiment described by way of the FIGS. 13 to 16 and by their projection 66 encompass the edge of the lens. The mask 84 according to the present embodiment is fixed to the lens in the position shown in FIG. 28 in such manner that the boundary line 108 and the vertical marker line 98 is located at the edge 5 of the lens 2 and that the reference lines 100 extend in parallel to the datum line 80. The mask 84 is positioned in the direction of the lens vertical 82 either in the way above-illustrated by FIG. 27 or with the aid of a marker applied before which designates the mounting position. After then the coating of the lens has been abraded inside the area delimited by the first portion 104 of the opening 86 to form the joining surface at said area, the fastener is adhesively bonded to the lens, namely preferably when the mask 84 is still fixed at the lens, as shown in FIG. 30. FIG. 30 reveals that the second portion 106 of the opening 86 permits to bond the fastener 18, although it projects from the edge of the lens, to the lens while the mask 84 is still fixed at the lens and therefore is adapted to serve as positioning aid for attaching the fastener 18.

FIG. 31 shows a modification of the mask 84 according to FIG. 28, the mask 84 according to FIG. 31 being different from the mask 84 according to FIG. 28 in that, in addition to the one opening 86, it has a second opening 86 and in that the parallel horizontal reference lines 100 only extend between the two vertical marker lines 98. The mask 84 according to FIG. 31 is altogether symmetrical to a not shown line of symmetry extending perpendicularly in FIG. 31. Said mask 84 can be cut, for instance, in its center so that then two masks are obtained the one of which is suited for use in forming a joining surface at the right-hand edge of either of the lenses and the other is suited for use in forming a joining surface at the left-hand edge of either of the lenses.

In the afore-described embodiments of the mask 84 the contour 90 of the opening 86 is a closed perimeter, i.e. a perimeter formed by a non-interrupted line or curve. Accordingly, in the above-described embodiments the opening 86 is a hole formed in the sheet 88 and the mask 84. Deviating from that, the opening 86 can be in the form of a recess starting from an edge of the mask 84 and being open at said edge, wherein the contour of the opening in that case is not a closed contour but an open contour, i.e. a contour formed by a non-closed curve or line. This contour merges into the edge of the mask 84. FIG. 32 shows an embodiment of the mask 84 having an opening which is formed in the above-explained way.

The embodiment of the mask 84 illustrated in FIG. 32 is a modification of the mask according to FIG. 28 from which the mask according to FIG. 32 substantially differs in that the opening 86 extends to an edge of the mask. In FIG. 32 this is the right-hand edge 110 of the mask 84. Correspondingly, the opening 86 is not closed at the edge 110 and the contour 90 of the opening merges into the edge 110. The above description of the first portion 104 of the embodiment according to FIGS. 28 to 30 applies to the first portion 104. Accordingly, the first portion of the opening 86 of the mask 84 according to FIG. 32 has a contour which coincides with the contour of the joining surface of the fastener and thus delimits at the lens the area in which the coating is abraded so as to form the joining surface at the lens.

The second portion 106 of the opening 86 is the one in the area of which the contour 90 is open and merges into the edge 110 of the mask 84. The second portion 106 can be reduced to zero in its length, that is to say in its extension toward the horizontal marker line 96, so that the opening 86 then consists exclusively of the first portion 104 and in the area of the opening 86 the edge 110 of the mask covers the edge 5 of the lens and coincides with the same. However, the mask 84 preferably extends beyond the edge 5 of the lens in a way shown in FIG. 32 so as to facilitate grasping the mask 84 when fixing the same at the lens and when removing it therefrom.

The invention relates to a method of manufacturing rimless spectacles in which fasteners of the lugs and the bridge of the spectacles are adhesively bonded to the front side or the rear side of the lenses. First two lens blanks are manufactured of a plastic material to the front and rear side of which a coating is applied. The two coated lens blanks are cut and ground in a way that two lenses having a desired lens shape are obtained. At predetermined mounting positions for the fasteners of the lugs and the bridge on the front or rear side of the lenses the coating is removed to form joining surfaces which substantially correspond to the joining surfaces of the fasteners as to shape and dimensions. The fasteners are then adhesively bonded to the front side and/or the rear side of the lenses at the mounting positions. Since in the area of the joining surfaces at the lenses the base material thereof is exposed, a permanently firm adhesively bonded joint can be produced between the fasteners and the lenses on the front or rear side thereof using adhesives known per se.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method of manufacturing rimless spectacles, the spectacles comprising two lenses, a bridge disposed between the two lenses for connecting the two lenses to each other, two lugs each of which is connected to one of the two lenses at an edge area of the lens facing away from the bridge, and two sides each of which is hingedly connected to one of the two lugs, the method comprising the steps of:
   a) manufacturing two lens blanks of a plastic material;
   b) applying a coating to the front side and the rear side of the lens blanks;
   c) machining the lens blanks in such way that the two lenses having a desired lens shape are obtained;
   d) manufacturing the two lugs, wherein each lug includes a fastener having a joining surface for connecting the lug to either of the two lenses;
   e) manufacturing the bridge, wherein the bridge includes two fasteners having a joining surface for connecting the bridge to the two lenses;
   f) determining the mounting positions for the fasteners of the lugs and the bridge on the front side or the rear side of the lenses;
   g) removing the coating at the mounting positions so as to form joining surfaces at the lenses; and
   h) adhesively bonding the fasteners of the lugs and the bridge to the front side and/or the rear side of the lenses at the mounting positions.

2. A method according to claim 1, characterized in that the applied coating comprises at least a hard layer and a dirt-repelling layer.

3. A method according to claim 2, characterized in that the applied coating further comprises an antireflection layer or a reflective layer.

4. A method according to claim 1, characterized in that at the mounting positions the coating is removed up to the entire thickness of the coating.

5. A method according to claim 1, characterized in that for forming the joining surfaces at the lenses the coating is removed at the mounting positions in an area of the front side and/or the rear side of the respective lens which substantially corresponds as to shape and dimensions to the joining surface of the respective fastener to be adhesively bonded.

6. A method according to claim 5, characterized in that the area has a substantially rectangular shape.

7. A method according to claim 1, characterized in that in step g) the coating is removed by grinding or milling.

8. A method according to claim 7, characterized in that the coating is removed by means of a face grinding tool which performs a high-frequency rotation or reciprocating movement.

9. A method according to claim 8, characterized in that the frequency of the rotation or the reciprocating movement is within the range of from 15 to 40 kHz, preferably within the range of from 24 to 30 kHz.

10. A method according to claim 1, characterized in that in step g) the coating is removed by abrasive-blasting abrasive particles.

11. A method according to claim 1, characterized in that in step g) the coating is removed by radiation with laser light.

12. A method according to claim 1, characterized in that in step h) first the respective fastener is arranged at and pressed onto the allocated mounting position and then an adhesive is introduced in a dosed amount between the joining surfaces provided at the lens and at the fastener.

13. A method according to claim 1, characterized in that, prior to step g), for a respective one of the fasteners a mask having an opening whose contour at least partly coincides with the perimeter of the joining surface of the fastener is detachably fixed at the lenses, namely such that the opening of the mask is provided at the mounting position for the fastener and there delimits the joining surface to be formed at the lens and that in step g) the coating is removed by an abrasive treatment of the front side or the rear side of the lens in the area delimited by the opening of the mask detachably fixed at the lens.

14. A method according to claim 13, characterized in that the abrasive treatment is performed by grinding.

15. A method according to claim 14, characterized in that the abrasive treatment is performed by a grinding tool.

16. A method according to claim 15, characterized in that the grinding tool performs a high-frequency rotation or reciprocating movement at a frequency within the range of from 15 to 40 kHz, preferably within the range of from 24 to 30 kHz.

17. A method according to claim 13, characterized in that the abrasive treatment is performed by milling.

18. A method according to claim 13, characterized in that in step f) the mounting position for the respective fastener is determined at the lens by means of the opening of the mask.

19. A method according to claim 13, characterized in that in step h) the fastener is adhesively bonded to the lens, while the mask is detachably fixed at the lens, wherein the fastener is attached to the lens in the area delimited by the opening of the mask fixed at the lens and is adhesively bonded to the lens in the thus given position relative to the latter.

20. A method according to claim 19, characterized in that an adhesive is introduced in a dosed amount between the joining surfaces provided at the lens and at the fastener after having attached the fastener to the lens.

21. A method according to claim 13, characterized in that the joining surface of a respective fastener has a substantially rectangular shape.

22. A method according to claim 1, characterized in that, prior to step h), the joining surface of the respective fastener is roughened.

23. A method according to claim 1, characterized in that, prior to step h), the joining surface of the respective fastener is treated with acetone.

24. A method according to claim 1, characterized in that a cyanoacrylate adhesive is used as adhesive for adhesive bonding.

25. A method according to claim 1, characterized in that each of the lugs and the bridge are made of a body and the fastener or fasteners, the body being manufactured of a material different from that of the fastener or fasteners.

26. A method according to claim 25, characterized in that the fasteners are manufactured of a flexible plastic material of low hardness.

27. A method according to claim 26, characterized in that the hardness of the plastic material is within the range of from 40 to 60 Shore D.

28. A method according to claim 26, characterized in that the plastic material is an aliphatic thermoplastic polyether polyurethane.

29. A method according to claim 25, characterized in that the body and the respective fastener are manufactured separately and are connected to each other by frictional or positive connection.

30. A method according to claim 26, characterized in that each fastener is connected to the pertinent body by attaching the fastener by an injection-molding process.

31. A method according to claim 25, characterized in that the body is manufactured of metal.

32. A method according to claim 25, characterized in that the body is manufactured of a plastic material.

33. A method according to claim 1, characterized in that each lug including its fastener is manufactured in one piece of a plastic material and that the bridge including its fasteners is manufactured in one piece including a plastic material.

34. A mask for use in a method of manufacturing rimless spectacles, in which fasteners of a bridge and of two lugs of the spectacles comprising joining surfaces are adhesively bonded to the front side or the rear side of two lenses, after at mounting positions a coating of the lenses has been removed for the fasteners so as to form joining surfaces at the lenses, the mask comprising:

a flexible sheet; and an opening formed in the sheet having a contour which coincides at least partly with a perimeter of a joining surface of a respective one of the fasteners, wherein the sheet has a surface which exhibits adhesion properties.

35. A mask according to claim 34, characterized in that the sheet is formed by a plastic film.

36. A mask according to claim 35, characterized in that the plastic film consists of polycarbonate.

37. A mask according to claim 35, characterized in that the plastic film is transparent.

38. A mask according to claim 34, characterized in that the sheet has a thickness within the range of from 0.1 mm to 0.3 mm, preferably of 0.15 mm.

39. A mask according to claim 34, characterized in that the contour of the opening is a closed contour and coincides with the perimeter of the joining surface of the respective fastener along the entire perimeter.

40. A mask according to claim 34, characterized in that the opening has two portions directly adjacent at a boundary line a first portion of which has a contour formed by the boundary line and a portion of the contour of the opening, wherein the contour of the first portion coincides with the perimeter of the joining surface of the fastener.

41. A mask according to claim 40, characterized in that the contour of the opening is a closed contour.

42. A mask according to claim 40, characterized in that the contour of the opening is open in the area of the second portion of the opening and merges into an edge of the mask.

43. A mask according to claim 34, characterized in that it exhibits an array of reference lines parallel to one another.

44. A mask according to claim 43, characterized in that it exhibits a second array of reference lines parallel to one another extending perpendicularly to the reference lines of the first array.

45. A mask according to claim 34, characterized in that, in addition to the one opening, in the sheet a second opening is formed which is arranged and shaped symmetrically to the one opening with reference to a line of symmetry extending between the two openings.

46. A mask according to claim 34, characterized in that the sheet is provided with a removable adhesive layer which constitutes the sheet surface exhibiting adhesion properties.

47. A mask according to claim 34, characterized by a detachable cover film which covers the sheet surface exhibiting adhesion properties.

* * * * *